Sept. 29, 1942.   H. F. KORS   2,297,565
BISCUIT AND COOKY CUTTER
Filed March 24, 1941
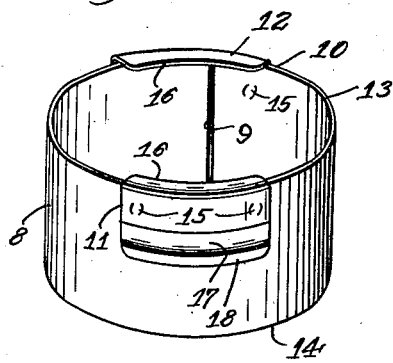
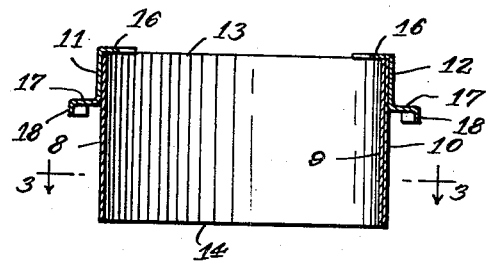
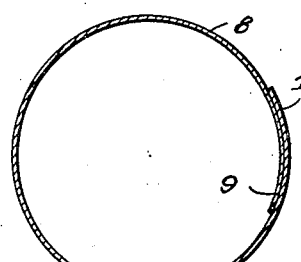
CUTTING
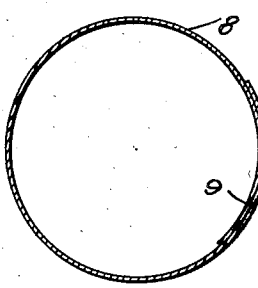
PICKING UP
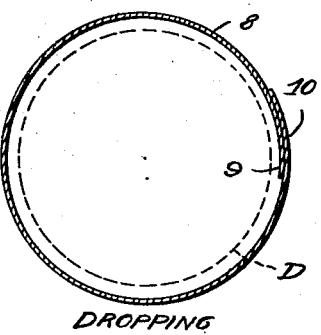
DROPPING
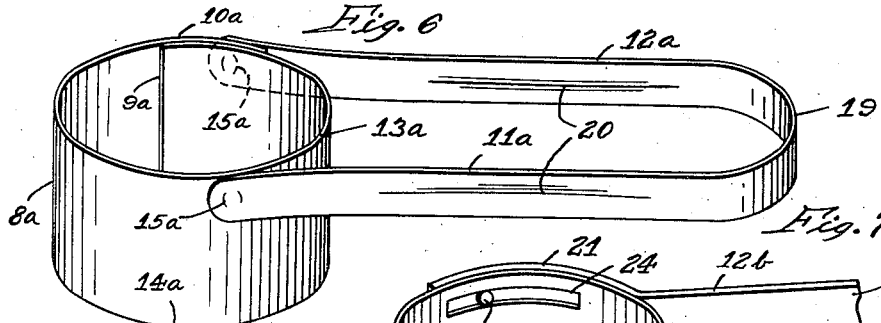
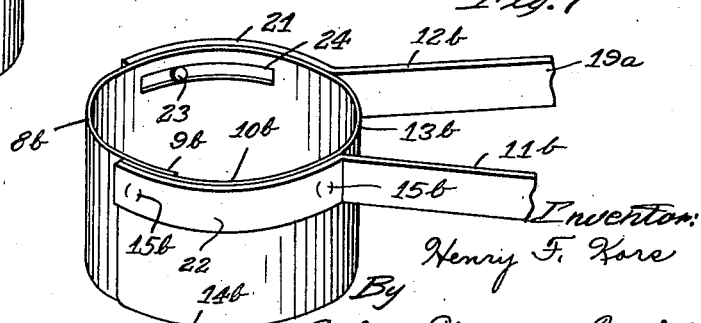
Inventor:
Henry F. Kors
By
McCanna, Wintercorn & Marabach
Attys.

Patented Sept. 29, 1942

2,297,565

UNITED STATES PATENT OFFICE 2,297,565

BISCUIT AND COOKY CUTTER

Henry F. Kors, Chicago, Ill.

Application March 24, 1941, Serial No. 384,908

15 Claims. (Cl. 30—316)

This invention relates to a new and improved biscuit and cooky cutter.

The principal object of my invention is to provide a simple and inexpensive utensil of the kind mentioned and one which enables easier operation and easier cleaning than has been possible with other utensils provided heretofore.

The salient feature of my invention consists in the mounting on and attachment directly to the diametrically opposed portions of a generally spiral flexible blade of handle means for manipulating the utensil, said handle means so applied greatly facilitating the manually controlled contraction and expansion of the blade, as required in the picking up and dropping of the dough discs cut by the blade.

The invention is illustrated in the accompanying drawing, in which—

Figure 1 is a perspective view of a biscuit and cooky cutter made in accordance with my invention;

Fig. 2 is a cross-section in a vertical plane diametrically through said utensil;

Fig. 3 is a horizontal section on the line 3—3 of Fig. 2 showing the blade in a medium degree of construction for cutting the dough;

Figs. 4 and 5 are sections like Fig. 3 but showing the blade further contracted in Fig. 4 for picking up the dough and expanded to normal diameter in Fig. 5 for dropping the dough, and Figs. 6 and 7 are perspective views illustrating two other modified or alternative constructions.

Similar reference numerals are applied to corresponding parts throughout the views.

Referring first to Figs. 1 to 5, the reference numeral 8 designates a blade of light gauge, flat, spring steel material, preferably stainless steel, formed to a generally spiral shape with free end portions 9 and 10 in slidable overlapping relation. The blade 8 carries handles 11 and 12 on the upper edge 13 in diametrically opposed relation, the lower edge 14 being the cutting edge. The handles 11 and 12 are alike and are stamped from sheet metal, also preferably stainless steel, and spot welded to the blade 8, as indicated at 15. Both handles are of arcuate form to follow the curvature of the blade, the handle 11 being affixed to the blade about midway between the end portions 9 and 10 and the handle 12 being affixed to the end portion 10. An inwardly bent flange 16 on the upper edge of each handle serves to locate the same by engagement with the upper edge 13 of the blade at the time the handles are welded to the blade, and the flange 16 on the handle 12 serves by engagement with the upper edge of the free end portion 9 to guide that portion in proper relation to the end portion 10 on which the handle 12 is carried, whereby to prevent upward displacement of the free end portion 9 relative to the other end portion 10, with relation to which it is slidable. The lower portion of each handle is flanged outwardly, as indicated at 17, to provide a shoulder against which the finger tips may be engaged in applying pressure to the blade, and the outer edge of the flanges 17 are preferably curled downwardly, as indicated at 18, to lend rigidity to the flanges 17 and avoid having exposed raw edges. One may, therefore, allow the finger tips to project over the outer edges of the flanges 17 in the manipulation of the utensil, without discomfort.

In operation, the utensil is grasped by engagement of the thumb with one of the handles and the first two fingers with the other handle and the blade 8 is contracted slightly, as indicated in Fig. 3, for cutting the dough for a biscuit or cooky. The flanges 17 afford wide enough shoulders for the finger tips in the application of what little pressure is required in cutting through the dough. Then the blade 8 is contracted enough to enable picking up the disc that has been cut, as indicated in Fig. 4, after which the disc, indicated in dotted lines at D in Fig. 5, can be dropped easily by relaxing the contracting pressure on the blade 8, allowing it to expand to its normal diameter, as indicated in Fig. 5. It is obvious that with the handles applied directly to the blade as herein disclosed, the operation of the utensil is greatly facilitated. Furthermore, the housewife can if she so desires vary the size of the discs cut, to suit individual preference, it being a simple matter to contract the blade to a greater extent than is indicated in Figs. 3 and 4 to produce discs D of smaller diameter when desired. Another noteworthy advantage of the present construction is the fact that the utensil can be very easily cleaned.

In Fig. 6 I have shown a blade 8a having affixed thereto a one-piece U-shaped handle 19, one arm 11a of which is spot welded to the blade, as indicated at 15a, approximately midway between the ends 9a and 10a, the other arm 12a being spot welded to the end portion 10a, the handle 19 being disposed in a horizontal plane parallel to and alongside the upper edge 13a and sufficiently spaced from the lower cutting edge 14a to provide clearance for the hand above the dough in grasping the handle. The two arms 11a and 12a are preferably ribbed longitudinally, as indicated at 20, to lend stiffness and also facilitate grasping the handle, by providing depressions along the outside of the arms in which one may engage the thumb on the arm 11a and the first two or three fingers on the arm 12a in grasping the handle. The handle 19 is preferably of stainless spring steel like the blade 8a. The operation of this utensil is believed to be obvious, the blade 8a being contractible by forcing the arms 11a and 12a toward each other, and the same being expansible back to normal diameter by simply relaxing the pressure on the handle.

The device shown in Fig. 7 is similar to that shown in Fig. 6. However the blade 8b in this utensil has a different form of handle 19a and the handle is applied differently. The two end portions 21 and 22 of the arms 11b and 12b are bent to arcuate form to follow the curvature of the blade 8b. The end 22 is welded, as at 15b, to the end portion 10b of the blade, relative to which the other end portion 9b is slidable. The end portion 21 of the handle has a stud 23 projecting radially inwardly therefrom and slidably received in a slot 24 provided therefor in the blade 8b intermediate the ends thereof and in a plane parallel with the upper edge 13b of the blade. Contraction of the handle 19a causes the free end 9b of the blade 8b to slide relative to the other end 10b, while the slotted intermediate portion of the blade is slidably guided by the arcuate end portion 21 of the handle and the stud 23 working in the slot 24 prevents downward displacement of the end portion of the handle relative to the blade when the blade is pressed into a piece of dough to cut a disc therefrom. The operation of this utensil is generally the same as that shown in Fig. 6, and it is obvious that both of these utensils may be easily cleaned.

It is believed the foregoing description conveys a good understanding of the objects and advantages of my invention.

I claim:

1. A culinary utensil of the character described, comprising a generally spirally curved flexible blade having free end portions in slidable overlapping relation, means providing a handle portion on the blade at a point intermediate the ends thereof substantially diametrically opposite said free end portions, and means providing a handle portion on the radially outer one of the free end portions of said blade.

2. A culinary utensil of the character described, comprising a generally spirally curved flexible blade having free end portions in slidable overlapping relation, a handle affixed to the upper edge portion of said blade remote from the lower cutting edge portion and at a point substantially diametrically opposite the overlapping free end portions of said blade, and another handle affixed to the radially outer one of said free end portions on the upper edge portion thereof and having a radially inwardly projecting portion for slidable engagement with the upper edge of the radially inner free end portion of said blade.

3. A culinary utensil of the character described, comprising a generally spirally curved flexible blade having free end portions in slidable overlapping relation, a handle affixed to the upper edge portion of said blade remote from the lower cutting edge portion and at a point substantially diametrically opposite the overlapping free end portions of said blade, and another handle affixed to the radially outer one of said free end portions on the upper edge portion thereof and having a radially inwardly projecting portion for slidable engagement with the upper edge of the radially inner free end portion of said blade, each of said handles having a radially outwardly projecting portion spaced below the top portions thereof for engagement by the finger tips in applying downward pressure on the utensil while grasping the handles.

4. A culinary utensil of the character described, comprising a generally spirally curved flexible blade having free end portions in slidable overlapping relation, a handle affixed to the upper edge portion of said blade remote from the lower cuting edge portion and at a point substantially diametrically opposite the overlapping free end portions of said blade, and another handle affixed to the radially outer one of said free end portions on the upper edge portion thereof, each of said handles having a radially outwardly projecting portion spaced below the top portions thereof for engagement by the finger tips in applying downward pressure on the utensil while grasping the handles.

5. A culinary utensil of the character described, comprising a generally spirally curved flexible blade having free end portions in slidable overlapping relation, and a pair of substantially identical handle members for manipulating said blade, one applied to the radially outer free end portion of the blade and the other to an intermediate portion of the blade, substantially in diametrically opposed relation to said free end portions.

6. A culinary utensil of the character described, comprising a generally spirally curved flexible blade having free end portions in slidable overlapping relation, and a pair of substantially identical handle members for manipulating said blade, one applied to the radially outer free end portion of the blade and the other to an intermediate portion of the blade, substantially in diametrically opposed relation to said free end portions, both of said handles having substantially radially inwardly projecting upper portions for locating engagement of the handles on the upper edge portions of the blade, the inward projection on the first mentioned handle slidably engaging the upper edge of the radially inner free end portion of the blade to guide said end portion in its sliding movement relative to the radially outer end portion of the blade in the manually controlled contraction and expansion of the blade.

7. A culinary utensil of the character described, comprising a generally spirally curved flexible blade having free end portions in slidable overlapping relation, and a pair of substantially identical handle members for manipulating said blade, one applied to the radially outer free end portion of the blade and the other to an intermediate portion of the blade, substantially in diametrically opposed relation to said free end portions, both of said handles having substantially radially inwardly projecting upper portions for locating engagement of the handles on the upper edge portion of the blade, the inward projection on the first mentioned handle slidably engaging the upper edge of the radially inner free end portion of the blade to guide said end portion in its sliding movement relative to the radially outer end portion of the blade in the manually controlled contraction and expansion of the blade, and each of said handles having a substantially radially outwardly projecting lower portion to form a finger tip rest.

8. A culinary utensil of the character described, comprising a generally spirally curved flexible blade having free end portions in slidable overlapping relation, and a pair of substantially identical handle members for manipulating said blade, one applied to the radially outer free end portion of the blade and the other to an intermediate portion of the blade, substantially in diametrically opposed relation to said free end portions, both of said handles having substantially radially inwardly projecting upper portions for locating engagement of the handles on the upper edge portion of the blade, the inward projection on the first mentioned handle slidably engaging the upper edge of the radially inner free end portion of the blade to guide said end portion in its sliding movement relative to the radially outer end portion of the blade in the manually controlled contraction and expansion of the blade, and each of said handles having a substantially radially outwardly projecting lower portion to form a finger tip rest, the outer edge portions of said finger tip rests being bent downwardly.

9. A culinary utensil of the character described, comprising a generally spirally curved flexible blade having free end portions in slidable overlapping relation, and handle means applied directly to said blade at a point on the radially outer one of the free end portions of said blade and at another point substantially diametrically opposite said free end portions for manually controlled radial contraction and expansion thereof.

10. A culinary utensil of the character described, comprising a generally spirally curved flexible blade having free end portions in slidable overlapping relation, and handle means applied directly to said blade for manually controlled radial contraction and expansion thereof, said handle means being applied to the blade at substantially diametrically opposed points, one of which is on the radially outer free end portion of the blade, whereby in the contraction of said blade the radially inner free end portion is slidably guided by the radially outer free end portion.

11. A culinary utensil of the character described, comprising a generally spirally curved flexible blade having free end portions in slidable overlapping relation, and a U-shaped handle for manipulating the blade disposed in a plane substantially parallel with the upper edge portion of the blade and having one of the arms thereof affixed to the radially outer free end portion of the blade and the other arm thereof attached to the blade at the substantially diametrically opposite side.

12. A culinary utensil of the character described, comprising a generally spirally curved flexible blade having free end portions in slidable overlapping relation, and a U-shaped handle for manipulating the blade disposed in a plane substantially parallel with the upper edge portion of the blade and having one of the arms thereof affixed to the radially outer free end portion of the blade and the other arm thereof slidably engaging the diametrically opposite portion of the blade on the outer side thereof.

13. A culinary utensil of the character described, comprising a generally spirally curved flexible blade having free end portions in slidable overlapping relation, and a U-shaped handle for manipulating the blade disposed in a plane substantially parallel with the upper edge portion of the blade and having one of the arms thereof affixed to the radially outer free end portion of the blade and the other arm thereof slidably engaging the diametrically opposite portion of the blade on the outer side thereof and having means providing a slidable pin and slot connection with that portion of the blade.

14. A culinary utensil of the character described, comprising a generally spirally curved flexible blade having free end portions in slidable overlapping relation, a U-shaped handle for manipulating the blade disposed in a plane substantially parallel with the upper edge portion of the blade, the end portions of the arms of said handle being bent to arcuate form to fit the curvature of the blade, one of said arcuately bent end portions being rigidly secured to the outer side of the radially outer free end portion of the blade, and the other arcuate end portion of the handle slidably engaging the outer side of the blade on the diametrically opposite side thereof, whereby the blade is slidably guided by the last named arcuate end portion and by the sliding engagement of the radially inner free end portion of the radially outer free end portion, and means for preventing downward displacement of said last named arcuate end portion of the handle relative to the blade.

15. A culinary utensil of the character described, comprising a generally spirally curved flexible blade having free end portions in slidable overlapping relation, a U-shaped handle for manipulating the blade disposed in a plane substantially parallel with the upper edge portion of the blade, the end portions of the arms of said handle being bent to arcuate form to fit the curvature of the blade, one of said arcuately bent end portions being rigidly secured to the outer side of the radially outer free end portion of the blade, and the other arcuate end portion of the handle slidably engaging the outer side of the blade on the diametrically opposite side thereof, whereby the blade is slidably guided by the last named arcuate end portion and by the sliding engagement of the radially inner free end portion on the radially outer free end portion, and means for preventing downward displacement of said last named arcuate end portion of the handle relative to the blade, comprising a stud on said arcuate end portion of the handle projecting substantially radially inwardly therefrom and slidably received in a slot provided therefor in the blade.

HENRY F. KORS.